(12) United States Patent
Ortiz-Gavin

(10) Patent No.: US 8,376,560 B2
(45) Date of Patent: Feb. 19, 2013

(54) COLLAPSED PARABOLA LIGHT REFLECTING UMBRELLA APPARATUS

(76) Inventor: Sergio Alejandro Ortiz-Gavin, Los Angeles, CA (US)

( * ) Notice: Subject to any disclaimer, the term of this patent is extended or adjusted under 35 U.S.C. 154(b) by 176 days.

(21) Appl. No.: 12/758,762

(22) Filed: Apr. 12, 2010

(65) Prior Publication Data

US 2010/0265691 A1    Oct. 21, 2010

Related U.S. Application Data

(60) Provisional application No. 61/168,617, filed on Apr. 12, 2009.

(51) Int. Cl.
*G03B 15/02* (2006.01)
(52) U.S. Cl. .................................. 362/17; 362/18
(58) Field of Classification Search ............... 362/3–18
See application file for complete search history.

(56) References Cited

U.S. PATENT DOCUMENTS 4,241,393 A * 12/1980 Olson ........................... 362/348
6,491,405 B1 * 12/2002 Shirilla ........................... 362/16
7,470,044 B2 * 12/2008 Maes ........................ 362/311.06

OTHER PUBLICATIONS

International Search Report dated Jul. 13, 2010, International Application No. PCT/US 10/30786 for Collapsed Parabola Light Reflecting Umbrella Apparatus, two pages.
Written Opinion of the International Searching Authority dated Jul. 13, 2010, International Application No. PCT/US 10/30786 for Collapsed Parabola Light Reflecting Umbrella Apparatus, four pages.

* cited by examiner

*Primary Examiner* — Jason Moon Han
(74) *Attorney, Agent, or Firm* — Edward C. Schewe

(57) ABSTRACT

A parabola light reflector includes multiple light reflecting surfaces on an umbrella skin. A first or outer skin is used to provide support for and to define the shape of the inner skin. A second or inner skin has a larger surface area than the outer skin and the inner skin is made up of panels of light reflecting material. The panels of the inner skin are stitched together in a variety of different configurations to achieve differing results. The inner skin is configured into a collection of three dimensional folds, creases, bends and angles that significantly increases the surface area of the inner skin that is available to reflect light and to create novel light dispersion patterns from a light source associated with the light reflector.

7 Claims, 9 Drawing Sheets

COLLAPSED PARABOLA LIGHT REFLECTING UMBRELLA APPARATUS

RELATED APPLICATION DATA

This application claims the benefit of U.S. Provisional Application Ser. No. 61/168,617 filed on Apr. 12, 2009 entitled Collapsed Parabola Light Reflecting Umbrella Apparatus.

BACKGROUND OF THE INVENTION

1. Field of the Invention

The invention relates generally to light reflecting umbrellas for use in stage, studio, motion picture and still photography.

2. Description of the Related Art

Photographers use different types of lighting devices to create diffused light for photographing their subjects. Light directly from a light source, such as a strobe, comes in a straight line and can produce harsh, hard shadows on a subject. Conventional devices create soft diffused light by directing light through a diffusing material or by bouncing light off a second surface. A need exists for an improved light reflector that expands the lighting options that photographers can use to shape the light and produce diffuse lighting to photograph their subjects.

SUMMARY OF THE INVENTION

The novel parabola light reflector umbrella disclosed herein utilizes multiple light reflecting surfaces. A first or outer skin is used to provide support for and to define the shape of the inner skin. A second or inner skin has a larger surface area than the outer skin and the inner skin is made up of panels of light reflecting material.

The invention includes the use of reflector umbrella skins made from a reflective textile or other reflective materials known to skilled persons to reflect light, including but not limited to textiles, fabric materials and aluminum metalized foil laminated to a black polyester backing material, all of which are within the scope of the present invention. In further embodiments, the inner skin is aluminum, steel or any other kind of metalized materials known to skilled persons.

The panels of the inner skin are stitched together in a variety of different configurations to achieve differing results. In embodiments, the inner skin is configured into a collection of three dimensional folds, creases, bends and angles that significantly increases the surface area of the inner skin that is available to reflect light and creates novel light dispersion patterns.

The collection of extreme three dimensional folds, creases, bends, angles and dramatic increase in the surface area of the inner skin that is available for reflecting light. The embodiments disclosed herein result in a soft, complex quality of light that has exceptional characteristics for photography and eliminates or reduces the need for placing or hanging diffusion over the front of the reflecting umbrella.

The apparatus disclosed herein also allows a user to take full advantage of the complex geometry of the parabolic shape of the umbrella. Other and further advantages and embodiments will be apparent to skilled persons from the accompanying drawings and disclosure.

DETAILED DESCRIPTION OF EMBODIMENTS OF THE INVENTION

Reference is made to the Figures in which elements of the illustrated embodiments of the invention are given numerical designations so as to enable one skilled in the art to make and use the invention. It is understood that the following description is exemplary of embodiments of the invention and it is apparent to skilled persons that modifications are possible without departing from the inventive concepts herein described.

Figure 1:
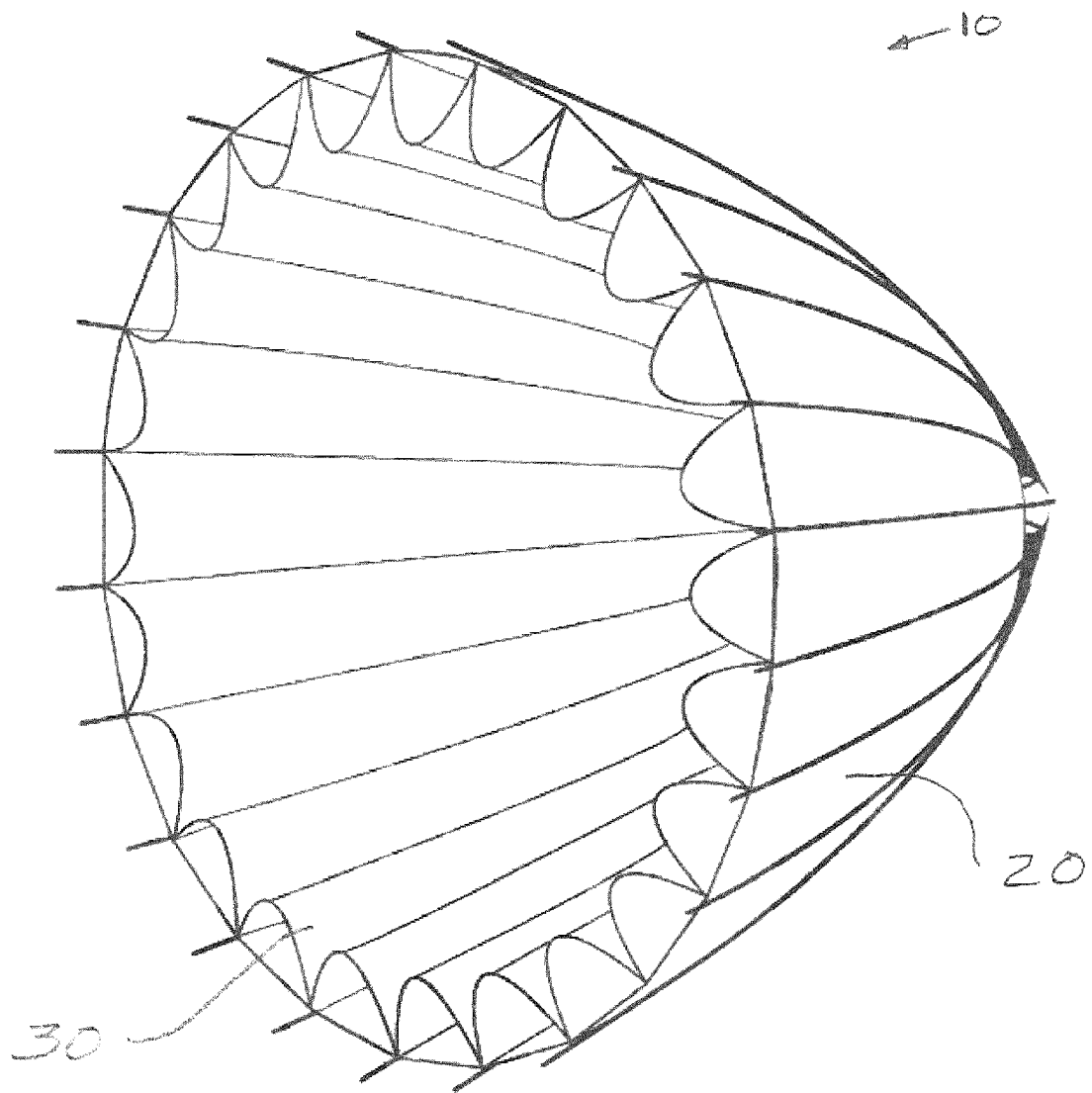
FIG. 1 shows an embodiment of the invention illustrating one configuration for the inner skin attached to the outer skin of the umbrella.

FIG. 1 shows an embodiment of the invention illustrating the light reflector 10 that can be used for stage, studio and motion picture lighting having the outer or supporting skin 20 arranged around the inner skin 30 with the light source (not shown) placed within the reflector 10.

In this embodiment, the outer skin 20 is made from a black polyester material or other backing materials well known in the art and is used to support the inner skin 30. The outer skin 20 is configured into a parabolic reflector shape and includes a paraboloid shape commonly known to skilled persons.

The inner skin 30 is made from light reflecting material known to skilled persons in the art and includes textiles, fabric materials and aluminum metalized foil laminated to a backing material. In further embodiments, the inner skin 30 is aluminum, steel and any of the metalized materials known to skilled persons.

Figure 2:
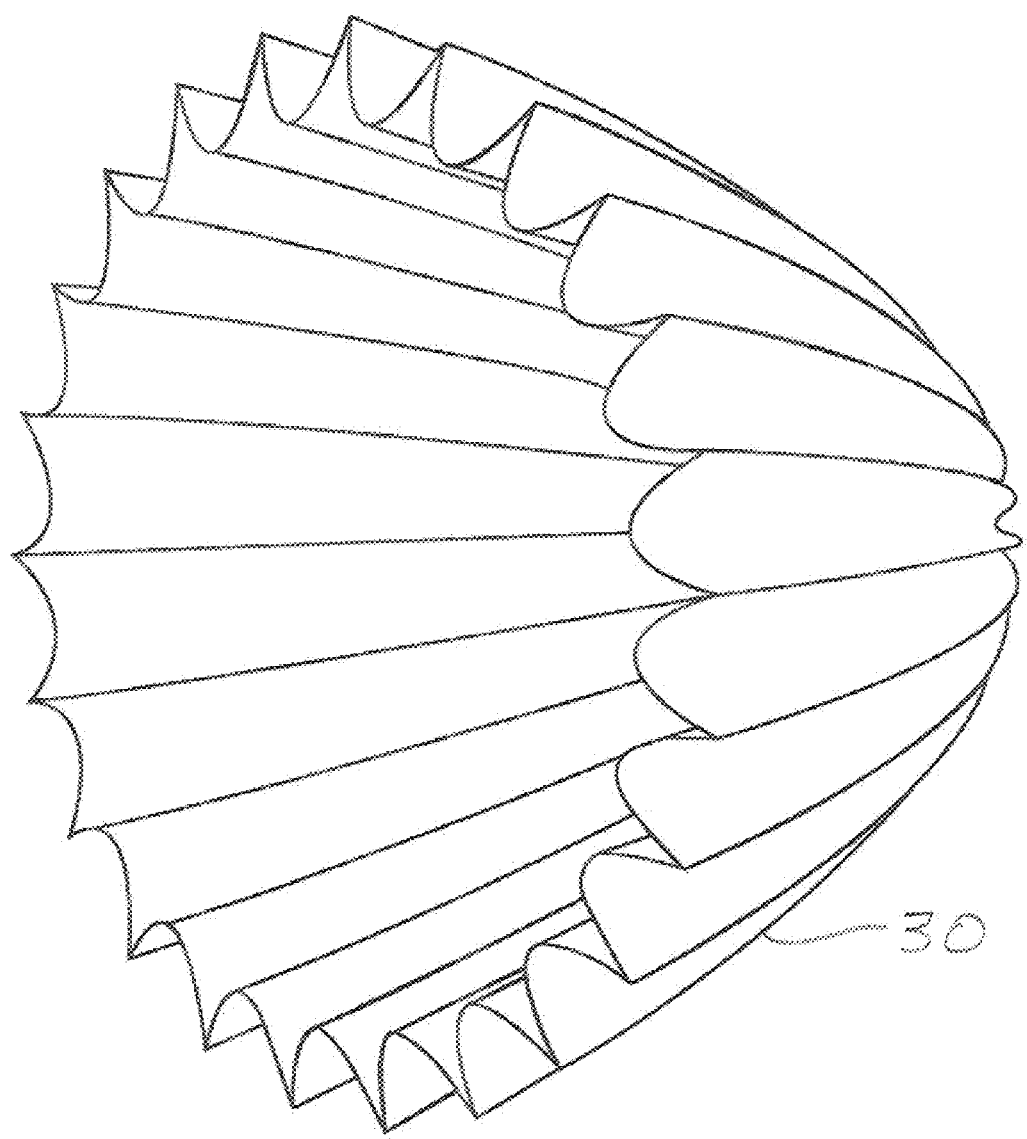
FIG. 2 is a perspective view that illustrates the inner skin configuration of the embodiment shown in FIG. 1.
Figure 3:
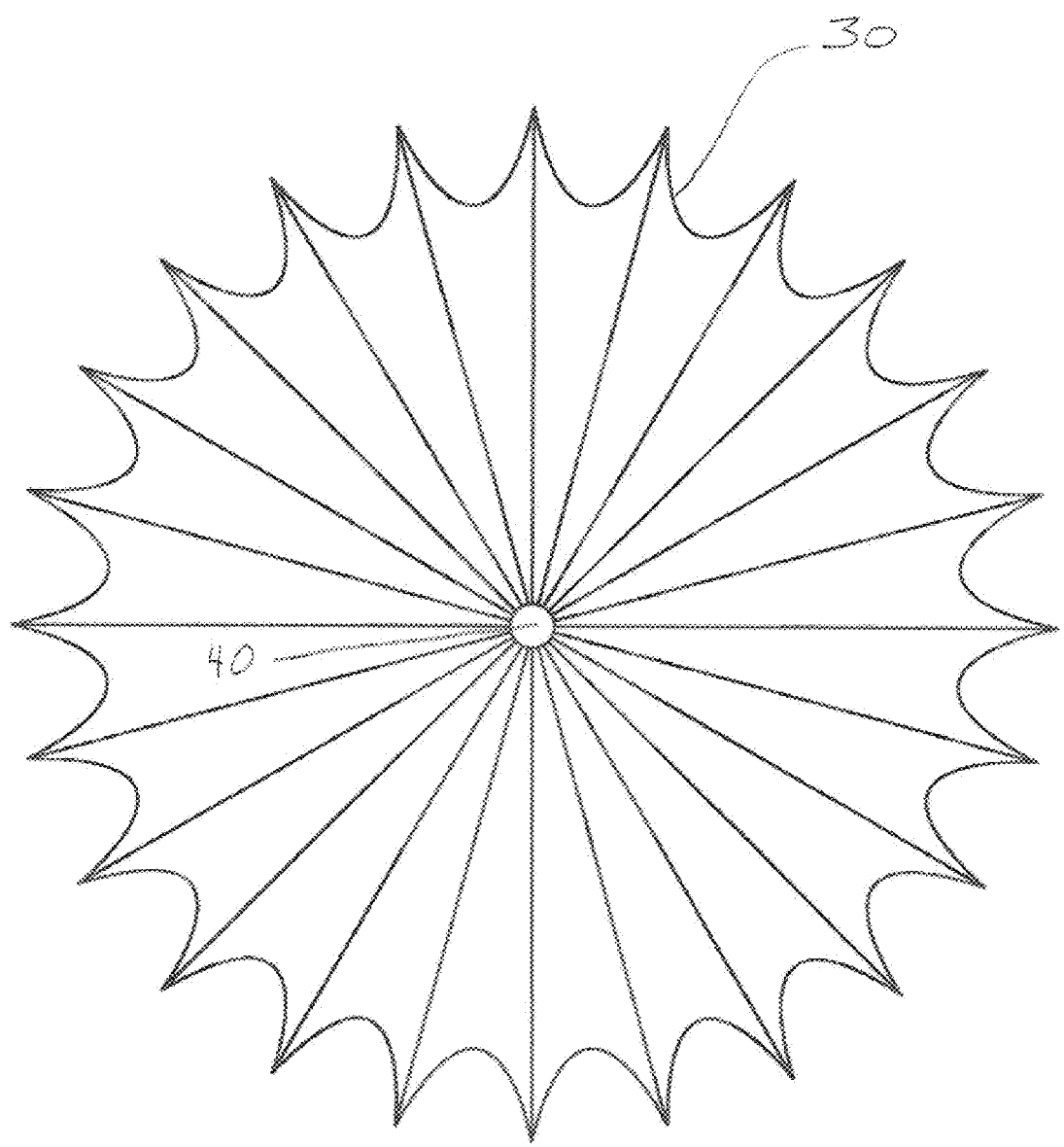
FIG. 3 is a front elevation view of the inner skin configuration of the embodiment shown in FIG. 1.
Figure 4:
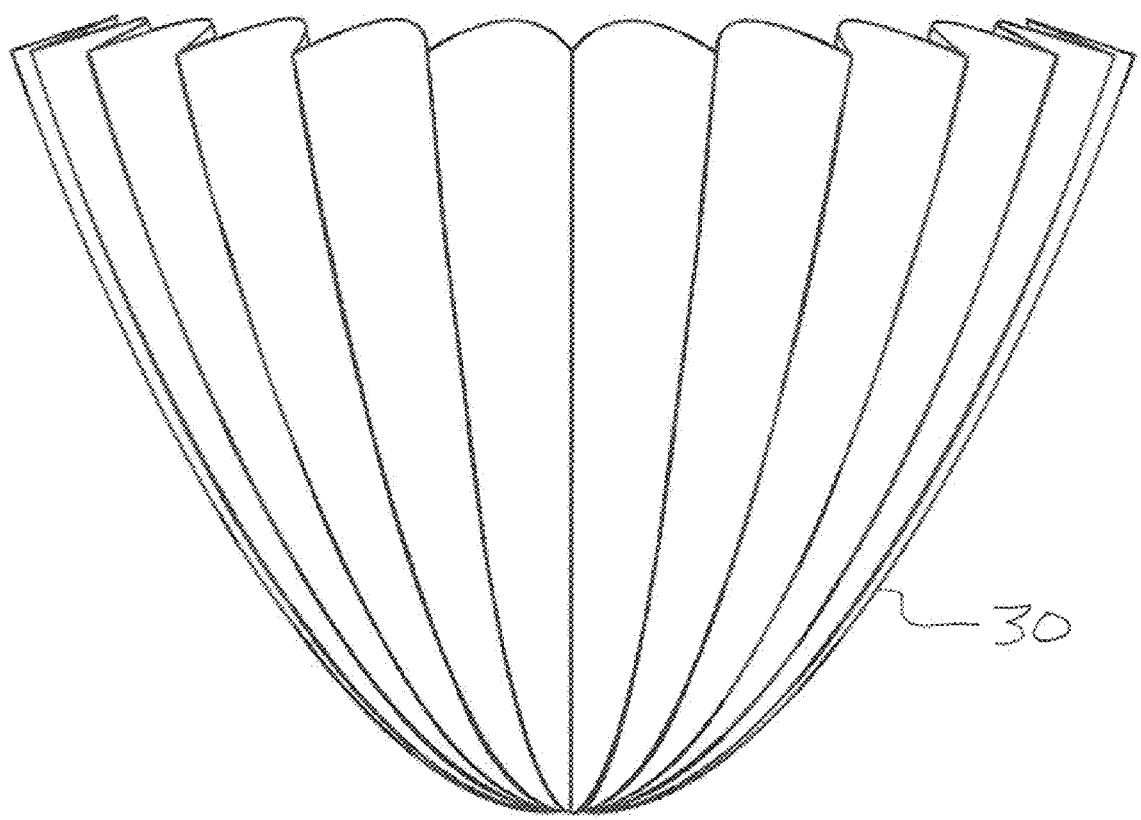
FIG. 4 is a side elevation view of the inner skin configuration of the embodiment shown in FIG. 1.

The inner skin 30 is secured to the outer skin 20 by polyester thread and sewn by hand and includes thread having UV stabilizer. The inner skin 30 is a larger size than a conventional reflector skin and is generally 1½ to 2½ times the size of a conventional reflector skin for the embodiments illustrated in the Figures. The invention includes all sizes of the inner skin 30 and the invention is not limited to the sizes for the particular embodiments described here. In further embodiments, the inner skin 30 is secured to the outer skin 20 by one or more adhesives known to skilled persons. FIG. 2 illustrates a perspective view of the inner skin 30 and FIG. 3 illustrates an elevation view of the inner skin 30 with the light source attachment area 40 shown. FIG. 4 is a side elevation view of the inner skin 30 for one or more embodiments.

Figure 5:
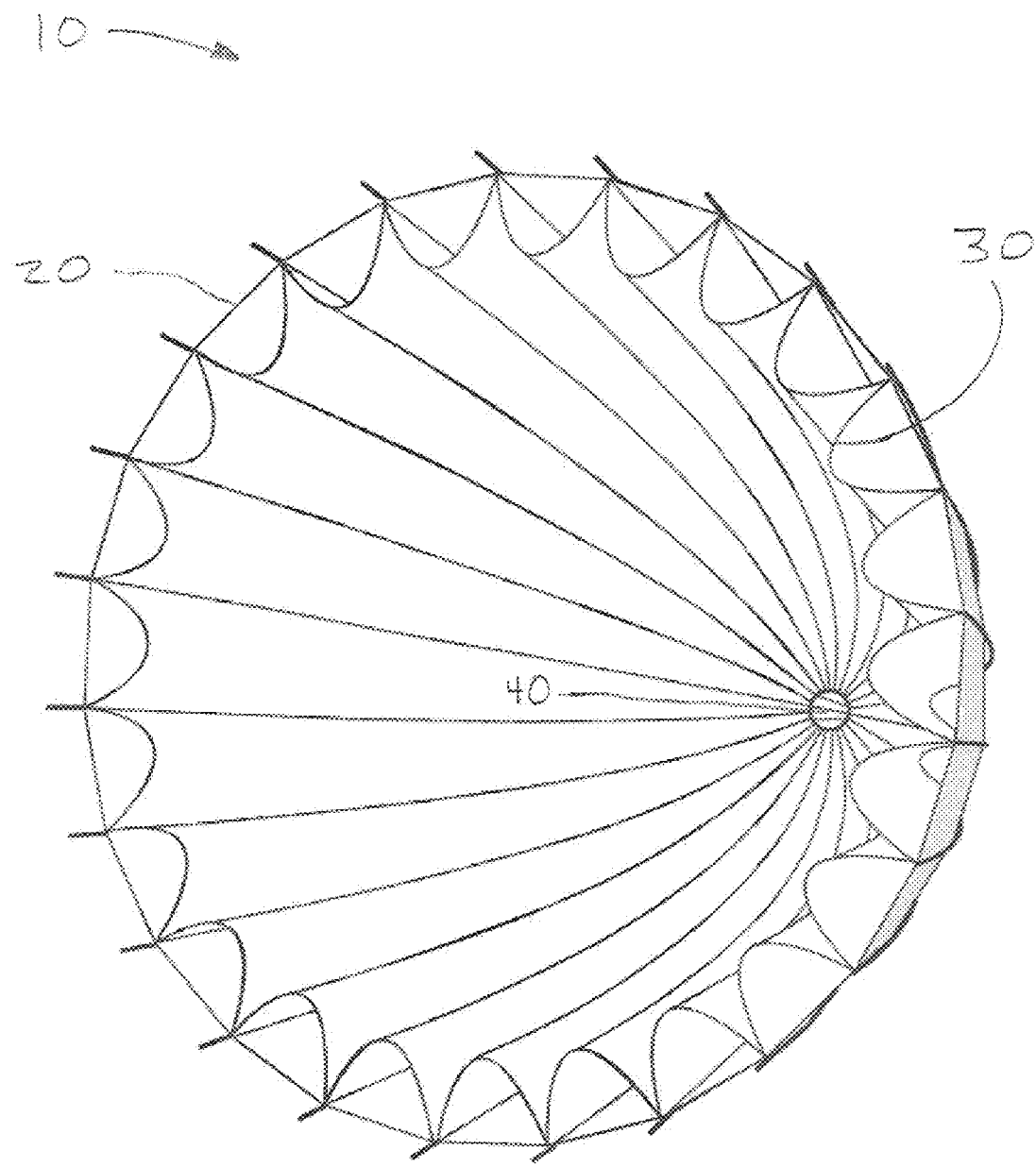
FIG. 5 is a perspective view of the embodiment of the invention with an arch cross sectional configuration for the inner skin attached to the outer skin of the light reflecting umbrella.

FIG. 5 illustrates one embodiment having an arch cross sectional configuration for the inner skin 30 attached to the outer skin 20 of the light reflector 10. FIG. 5 shows the light source attachment area 40 where the light source for the light reflector 10 is positioned.

Figure 6:
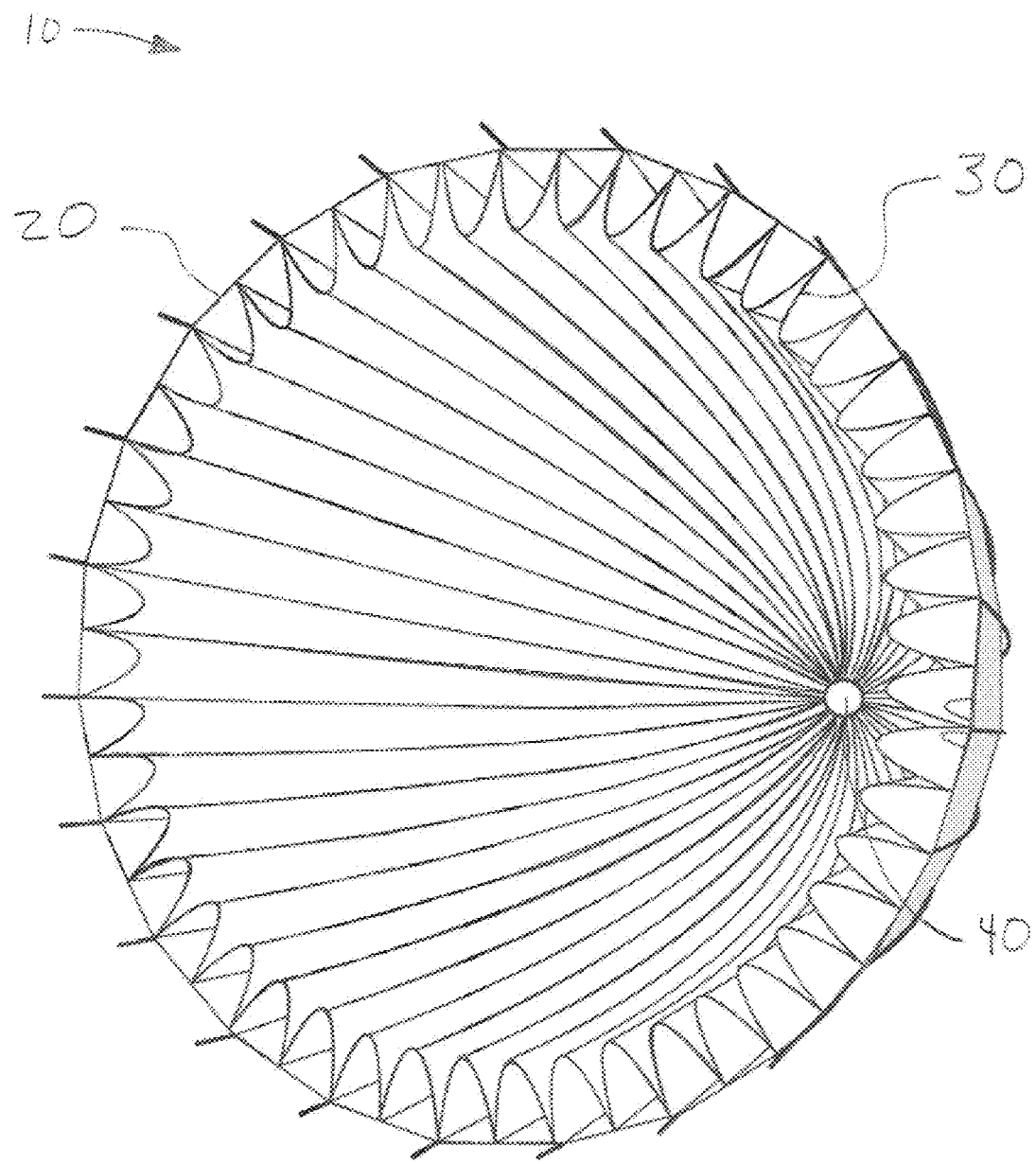
FIG. 6 is a perspective view of an embodiment of the invention with another arch cross sectional configuration for the inner skin attached to the outer skin of the light reflecting umbrella.

FIG. 6 shows another embodiment with an arch cross sectional configuration for the inner skin 30 attached to the outer skin 20 of the light reflector 10.

Figure 7:
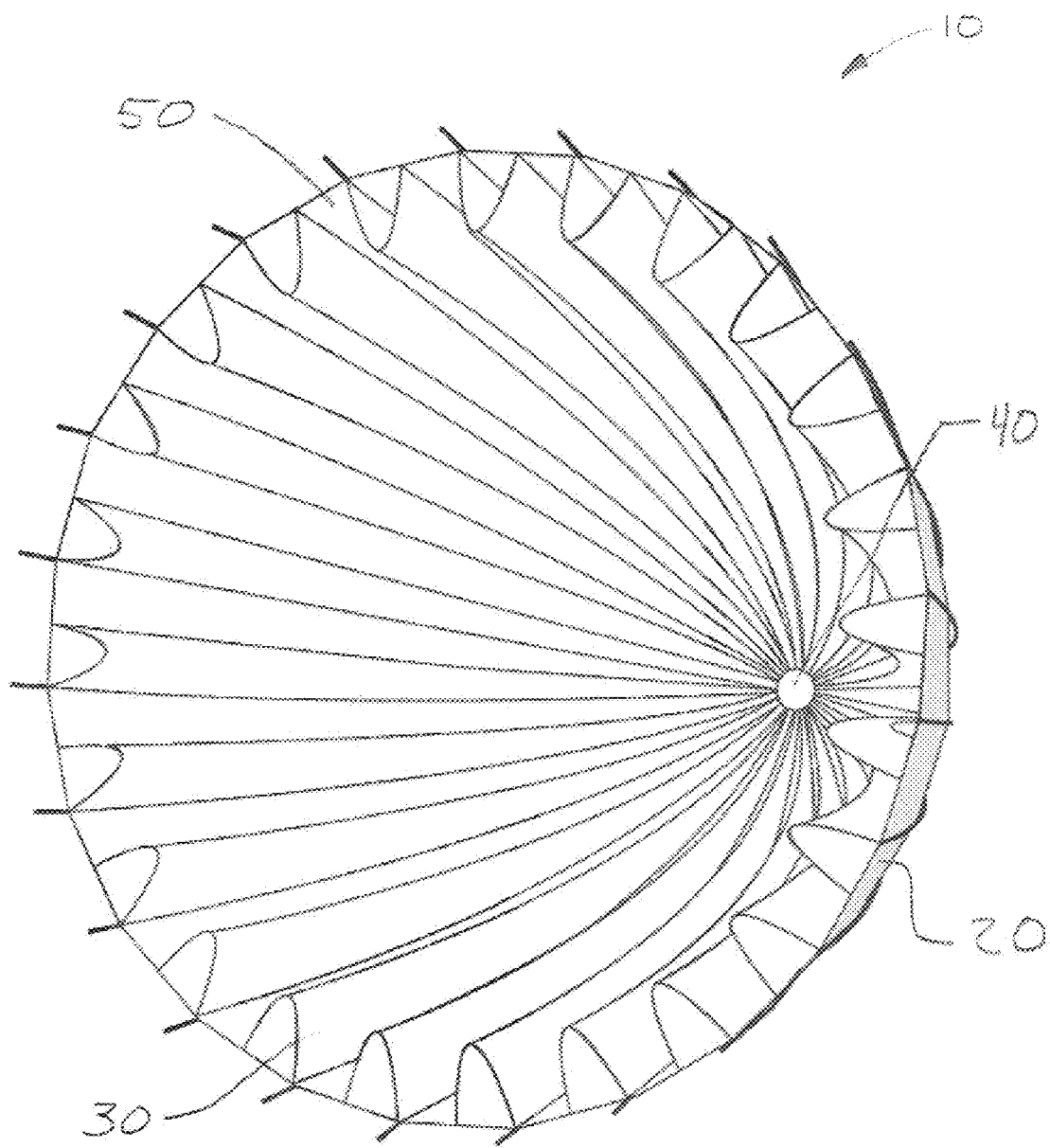
FIG. 7 is a perspective view of a further embodiment of the invention with another arch cross sectional configuration for the inner skin attached to the outer skin of the light reflecting umbrella and showing the spaces between the inner skin shapes that can accommodate different materials.

FIG. 7 shows another embodiment with an arch cross sectional configuration for the inner skin 30 attached to the outer skin 20. In this embodiment, the inner skin 30 is made from separate individual panels that are attached to the outer skin 20 as shown in FIG. 7.

The spaces between the inner skin 30 shapes, shown as space 50 in FIG. 7, are used to attach a light reflecting material such as textiles, fabric materials and aluminum metalized foil. In further embodiments, non-reflective materials, such as black polyester material or other backing materials that absorb light and known to skilled persons, are applied to space 50 and the spaces between the inner skin 30 shapes.

Figure 8:
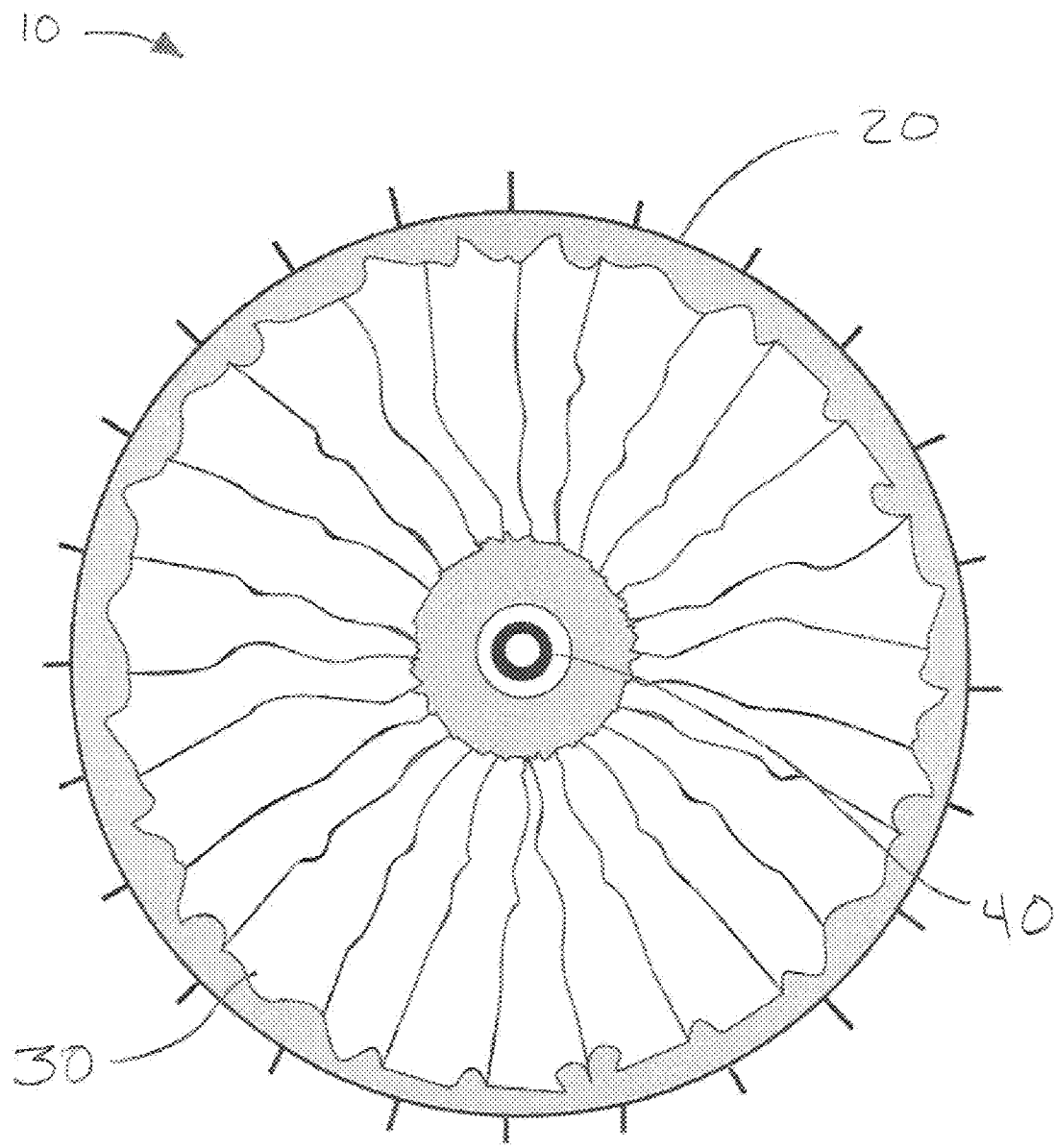
FIG. 8 is a front elevation view of the invention showing one embodiment of a collapsed parabola configuration for the inner skin.
Figure 9:
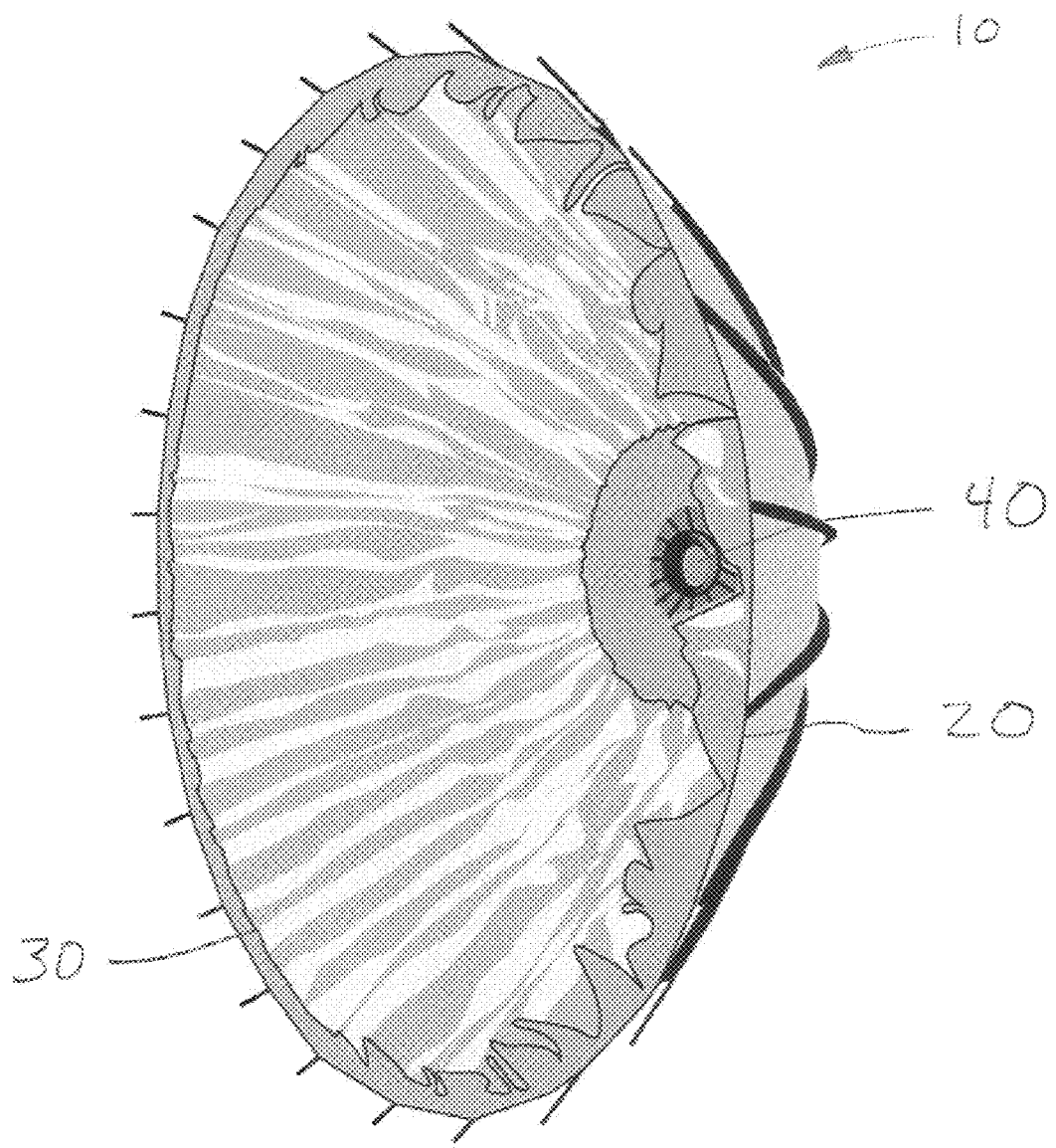
FIG. 9 is a perspective view of one embodiment of a collapsed configuration for the inner skin of the light reflecting umbrella apparatus of the invention.

FIG. 8 shows an embodiment of the invention with the inner skin 30 configured in a collapsed configuration and attached to the outer skin 20. The inner skin 30 is secured to the outer skin 20 by polyester thread or any of the other adhesives known to skilled persons. FIG. 9 illustrates a perspective view of an embodiment of a collapsed configuration. In the embodiments shown in FIG. 8 and FIG. 9, the inner skin 30 is configured into a collection of three dimensional folds, creases, bends and angles that significantly increases the surface area of the inner skin 30 that is available to reflect light and creates novel light dispersion patterns.

While the present invention has been described with regards to particular embodiments, it is recognized that additional variations of the present invention may be devised by persons skilled in the art without departing from the inventive concepts disclosed herein and the invention includes the full breadth and scope of the claims.

What is claimed is:

1. A photography light reflecting apparatus comprising an outer support configured into a substantially parabolic shape and adapted to provide support for and to define the shape of an inner skin; the inner skin supported by the outer support and secured substantially within the substantially parabolic shape of the outer support, the inner skin comprised of light reflecting material and adapted to be secured about a light source, the inner skin being highly reflective and does not allow light to pass through for diffusion purposes, the inner skin configured into a series of substantially half conical shapes and adapted to reflect light from the light source, wherein the inner skin comprises a series of individual panels with varying light reflecting properties.

2. The light reflecting apparatus of claim 1 wherein the half conical shapes of the inner skin each have as substantially arch shaped cross sectional configuration.

3. The light reflecting apparatus of claim 1 wherein the panels are arranged onto the outer support and the panels that are adjacent to each other are separated by a second light reflecting material.

4. The light reflecting apparatus of claim 1 wherein the panels are arranged onto the outer support and the panels are separated by light absorbing material.

5. A new collapsed parabola light reflecting apparatus for photography comprising:
    a first skin comprised of a light absorbing material, the first skin configured into a substantially parabolic shape about a light source and adapted to support and substantially define the shape of a second skin; and
    the second skin made of light reflecting material, the second skin support on the first skin and configured about the light source for reflecting light from the light source, the second skin having a larger surface area than the first skin and the second skin is configured into a collection of three dimensional folds, creases, bends and angles so that the second skin fits within the volume of the substantially parabolic shape of the first skin when the second skin is supported on the first skin, wherein the second skin comprises a series of individual panels with varying light reflecting properties.

6. The collapsed parabolic of claim 5 wherein the light reflecting material of the second skin is from the group consisting of textiles, metalized foil, aluminum and steel.

7. The collapsed parabola of the claim 5 wherein the surface area of the second skin is approximately in the range of 1½ to 2½ times the surface area of the first skin.

* * * * *